Patented July 18, 1944

2,353,723

UNITED STATES PATENT OFFICE 2,353,723

COMPOSITION OF MATTER FOR CRACK SEALERS OR THE LIKE

Edwin O. Groskopf, Rutherford, N. J., assignor to The Patent and Licensing Corporation, New York, N. Y., a corporation of Massachusetts No Drawing. Application April 21, 1941,
Serial No. 389,632

2 Claims. (Cl. 260—758)

This invention relates to a composition of matter designed for use as a sealing compound and more particularly as a sealer for the joints or seams between the sides of automobile bodies and the floor thereof in order to prevent entrance of dust and fumes such as those of carbon monoxide into the interior of the automobile body.

Heretofore, in the construction of automobile bodies, the seams or other crevices through which carbon monoxide fumes might gain access into the interior of the body have been sealed by the application of compounds made from rubber, asphalt, resins and the like, admixed with fibers and various fillers, and dissolved in volatile solvents. For a number of reasons, as will hereinafter be pointed out, these compositions have not been altogether satisfactory and their application to the seams or other cracks to be sealed is attended with a number of difficulties in practice. Because the fluidity of the compositions heretofore used is obtained by means of volatile solvents such as naphtha, they are inflammable and fires are not infrequently caused during the production of automobile bodies because of the necessity of carrying on welding operations subsequent to the application of the sealing compound and while the fumes of the volatile solvents are still present. The volatile solvents in these compositions not only render them inflammable, but also have a toxic effect.

A necessary requirement of the compositions employed to seal the seams or cracks in automobile bodies is that the dried film of the composition should possess sufficient firmness so as not to be injured by or adhere to the heels of workmen in subsequent operations on the interior of the body, such as the operation of applying upholstery. With that in view, compositions that have heretofore been used for this purpose have been made from a relatively hard base dissolved in very volatile solvents, with the result that when the automobile body having films of these compositions applied to the cracks or seams are passed through high temperature ovens, the exceedingly rapid evaporation of the solvent frequently causes the wet or plastic film to blister or to produce pin holes in the films. The presence of such pin holes in the dried films entails the danger that carbon monoxide fumes may enter the interior of the body. Moreover, the dried films of the crack sealing composition become brittle at low temperatures and do not possess sufficient flexibility to retain their integrity, free from cracks, under the strains of weaving and vibration occurring in the operation of automobiles, particularly at temperatures below 0° F.

From a practical operating standpoint in the construction of automobile bodies, it is required that these crack sealing compositions be applied by spraying or extruding it over or onto the seams, joints or crevices to be sealed, the choice of the particular method of application depending mainly on the location of the seam, joint or crevice. Spraying of the composition is preferable because better contact with the metal of the car body can thereby be obtained and is accordingly employed wherever it is convenient or permissible to atomize the composition. However, in certain locations in the car bodies, such as in the rear corner of the trunk compartment or on the shoulders of the wheel housing, it is impractical or impossible to spray the composition and in such instances, therefore, a non-atomizing or extrusion-type gun is employed so as to enable the operator to place the nozzle of the gun in contact with the difficultly accessible seams or crevices and by moving the nozzle along or over the seam or crevice, to apply the composition thereto in the form of an extruded ribbon extending over or around the seam or crevice. In some instances this mode of application must be performed by the operator through his sense of feel rather than by actual visual observation.

The principal object of my invention is to provide a composition suitable for use in sealing the joints, seams or crevices in automobile bodies. More specifically, the objects of the invention are to provide a composition for that purpose which is non-inflammable, will be equally efficient for application over the joints and seams whether applied by spraying or by extruding the same; to provide a composition for that purpose which is of such a nature that when applied in films of the required thickness, say $\frac{1}{16}$ to $\frac{1}{8}''$, will not spread or flow too much, be capable of withstanding relatively high temperatures of the order of 300° F. almost immediately after application, and of drying at these temperatures without formation of pin holes in or objectionable blistering of the film; to provide a composition of the character indicated which is capable of forming dried films that adhere with sufficient tenacity to metal and are sufficiently firm immediately after being baked at temperatures of the order indicated, to withstand being injured by contact with the heels of workmen or being washed away or losing bond with the metal by the force of the water sprays and air jets used in the operation of washing automobile bodies after being baked; to provide a composition of this character which is capable of forming dried films, under the conditions stated that are flexible over a wide range of temperatures, more particularly at temperatures below 0° F. so as not to be cracked or otherwise injured by vibration, weaving or other distortional effects encountered in service; and in general, to provide an improved form of composition that is suited to present day demands in respect of application technique and serviceability of a crack sealer in automobile body construction.

The base of the composition embodying my invention comprises a thermoplastic material such, for example, as asphalt or other bitumen, pitch or resinous material that is thermoplastic and waterproof.

The thermoplastic material comprising the base of the composition is employed in the form of an emulsion thereof in water, this emulsion being combined with other ingredients as will be hereinafter more fully described, to produce the sealing composition possessing the properties above mentioned.

Compositions embodying the invention are typified by the following formula, wherein an aqueous emulsion of a thermoplastic material is combined with other ingredients in approximately the proportions indicated, namely:

| | Per cent |
|---|---|
| Bituminous emulsion | 50 |
| Ground vulcanized rubber | 6 to 8 |
| Bentonite | 2 to 5 |
| Oxalic acid | 0.6 to 0.7 |
| Wetting agent | 0.10 |
| Amphibole | 6 to 8 |
| Water | 30 to 35 |

In the above formula, the bituminous emulsion preferably comprises an emulsion of asphalt having a melting point of 125 to 135° F. and 50 to 60 penetration (at 77° F.), the asphalt being emulsified in the aqueous medium with bentonite as an emulsifying agent so that the emulsion will contain 60 to 65% asphalt, approximately 2½% bentonite and the balance water. Desirably also, the average particle size of the emulsion is from about 7 to 10 micron, this particle size being the optimum for securing a uniform sealing effect in the dried film formed by the composition.

The ground vulcanized rubber that is mixed with the emulsified thermoplastic material is employed primarily for the purpose of flexibilizing the dried film of the composition so that at exceedingly low temperatures, say temperatures of the order of 0° F. or less, the film will not crack or chip when subjected to strains or stresses, as would the thermoplastic material itself at those temperatures. With that end in view, I prefer to employ vulcanized rubber of the soft-cured type, such as black inner tubes, ground to as fine a mesh as possible. I have found that rubber ground to a size such that the particles will pass through a screen of 20 mesh is satisfactory.

The additional quantities of bentonite (other than that employed in making the emulsion of the thermoplastic material) serves to facilitate the mixing of the emulsion with the ground rubber and other ingredients of the composition, to impart the desired viscosity and mobility to the composition and to stabilize the composition against being broken by frictional effects when pumping the same through pipes or by the action of the gun mechanism when spraying it or by chemical action of metallic surfaces with which the composition may come in contact, such as pressure tanks, galvanized iron conveyor pipes, etc.

The purpose of the oxalic acid in the composition is twofold. In the first place, since vulcanized rubber normally contains compounding or other ingredients in the form of salts or compounds of bivalent or other polyvalent metals, such as zinc oxide, calcium carbonate, barium sulphate or similar salts, or substances such as clay which in solution yield bivalent or polyvalent metal ions, the effect of these salts or compounds upon the viscosity or consistency of the composition, particularly during storage, is substantially eliminated by treatment of the vulcanized rubber with the oxalic acid. The purpose of this treatment is to convert the bivalent or other polyvalent metal salts or compounds into a corresponding oxalate, the solubility of which is much less than the solubility of the salt or compound contained in the rubber. In lieu of oxalic acid, other suitable acidic reagents may be employed to convert these components of the rubber into highly insoluble salts. Secondly, oxalic acid has a peptizing effect upon bentonite and hence, when employed in appropriate quantities, serves to peptize the product and thereby impart a consistency and body characteristic such as to enable the composition to be readily sprayable. This bodying function of the oxalic acid will generally be obtained when employing an amount thereof sufficient to furnish, after complete reaction with the bivalent or polyvalent metal ions in the composition, an amount of free acid to bring the hydrogen ion concentration of the composition to the order of 5.8 to 6.3. In lieu of oxalic acid, other carboxylic acids such as tartaric, or citric acid may be employed for obtaining this bodying effect.

The wetting agent in the composition indicated by the above formula is selected from among those that will increase the wettability of the rubber by the aqueous suspension of bentonite and improve the wettability of the ingredients for one another under the conditions of acidity prevailing when the ground rubber is mixed with the bentonite and the oxalic acid solution. A wetting agent which I have found suitable under these acid conditions for improving the wettability of the rubber and the other ingredients by the aqueous suspension of bentonite is a material known as Aerosol O. S. sold by American Cyanamid Company and said to constitute isopropyl naphthalene sodium sulphonate.

The amphibole fibers are incorporated in the composition in order to reinforce and strengthen the dried films obtained from the composition when the same has been applied in layers and the water phase eliminated. Preferably about three-quarters of the amphibole consists of relatively long fiber material, say ⅛ to ¼" length, known as amphibole No. 60, and the balance consists of relatively short or powdery material, known as amphibole No. 25. I prefer to use amphibole because of its freedom from salts or oxides of bivalent or polyvalent metals which may affect the pH of the product or modify its viscosity or body during storage so as to interfere with proper spraying of the product or otherwise undesirably affect its behavior during application. In lieu of amphibole, there may be employed mineral fibers such as asbestos. In this case, if the asbestos contains lime, magnesium or similar oxides, or salts the solubility of which may be such as to substantially affect the pH of the product or its viscosity or body characteristics, additional amounts of oxalic acid or similar reagent may be incorporated to convert these oxides or salts of the bivalent or polyvalent metal into relatively insoluble salts.

In making compositions according to the formula above given, the wetting agent and the oxalic acid may first be dissolved in boiling water, then suitable quantities of bentonite, preferably in the form of an aqueous suspension thereof, may be added to the hot solution. The acidity of the mixture at this stage should be of the order of approximately pH 2.0. While maintaining the mixture at about the boiling point, the ground vulcanized rubber is added thereto accompanied by agitation. When the rubber has been uniformly incorporated in the hot suspension, the mass is allowed to stand in order to permit the reaction between the oxalic acid and the bivalent and polyvalent metal salts contained in the rubber to proceed to completion, whereupon the amphibole fibers are mixed into the aqueous mass. The asphalt emulsion is then introduced into mass, the mass having preferably first been reduced to a temperature of 100° F. or less in order to prevent the accurrence of such thickening of the mixture when the emulsion is added thereto as would necessitate adding water in amounts which undesirably affect the body of the product. After the whole mass has been mixed until uniform, the composition should have a viscosity of 50 to 70 McMichael, at 77° F. Its body or fluidity is such that when applied in the form of a ribbon ¼" thick and ½" wide upon a metal panel held at an angle of 45° to the horizontal, the applied ribbon will not spread more than 1", desirably not more than ½", so that the dried film will be not more than 1½", and desirably not more than 1" in width, and is capable of application in the form of a ribbon or film of the width and thickness above mentioned either by spraying or by extrusion of the same.

When the composition is to be applied by extrusion over the crack, joint or seam to be sealed thereby, it is desirable to add thereto a wetting agent functioning to enhance the wetting of the metal by the composition, it being usually more difficult to attain satisfactory adhesion of the composition to metal when applied by extrusion than when applied by spraying the same. The wetting agent selected for this purpose must be one that will render the product adequately wettable to other surfaces such as metal, at the pH value of the product. For this purpose the material known as Aerosol O. T., sold by American Cyanamid Company, and said to consist of an ester of a sulphonated dicarboxylic acid (with the polar or water-solubilizing group approximately in the middle of a branched chain) added to the composition in an amount approximating 0.13% by weight of the composition, has proved satisfactory.

I claim:

1. A crack sealer composition comprising an aqueous emulsion of bitumen mixed with 6 to 8% ground particles of vulcanized rubber, 2 to 5% bentonite, and 6 to 8% mineral fiber, said composition having a pH of between approximately 5.8 to 6.3, and viscosity and body characteristics such that it is sprayable, and being capable, when applied in layers of substantial thickness, of drying at temperatures of the order of 300° F. without blistering or forming pin holes to form films that are flexible at temperatures below 0° F.

2. A crack sealer composition comprising an aqueous emulsion of bitumen mixed with 6 to 8% ground particles of vulvanized rubber, 2 to 5% bentonite, and 6 to 8% amphibole, said composition having a pH of between approximately 5.8 and 6.3, and viscosity and body characteristics that do not become substantially modified during storage of the composition and such that it is sprayable, and being capable, when applied in layers of substantial thickness, of drying at temperatures of the order of 300° F. without blistering or forming pin holes to produce dry films that are flexible at temperatures below 0° F.

EDWIN O. GROSKOPF.